(12) United States Patent
Fujii et al.

(10) Patent No.: US 11,630,466 B2
(45) Date of Patent: Apr. 18, 2023

(54) SERVER, INFORMATION PROCESSING SYSTEM, NON-TRANSITORY COMPUTER-READABLE MEDIUM, AND CONTROL METHOD

(71) Applicant: TOYOTA JIDOSHA KABUSHIKI KAISHA, Toyota (JP)

(72) Inventors: Hiromitsu Fujii, Kariya (JP); Kohei Miwa, Nisshin (JP); Yuko Mizuno, Nagoya (JP); Shinsuke Ariga, Nagoya (JP); Hirotaka Omisha, Nisshin (JP); Tsuyoshi Okada, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 158 days.

(21) Appl. No.: 16/953,009

(22) Filed: Nov. 19, 2020

(65) Prior Publication Data

US 2021/0192957 A1 Jun. 24, 2021

(30) Foreign Application Priority Data

Dec. 19, 2019 (JP) .............................. JP2019-229665

(51) Int. Cl.
*G05D 1/02* (2020.01)
*G08G 1/00* (2006.01)
*G06V 20/56* (2022.01)
*G06V 10/56* (2022.01)
*G09G 5/02* (2006.01)

(52) U.S. Cl.
CPC ......... *G05D 1/0297* (2013.01); *G05D 1/0217* (2013.01); *G05D 1/0293* (2013.01); *G06V 10/56* (2022.01); *G06V 20/56* (2022.01); *G08G 1/20* (2013.01); *G08G 1/22* (2013.01); *G05D 1/0231* (2013.01); *G09G 5/02* (2013.01); *G09G 2320/0666* (2013.01); *G09G 2380/10* (2013.01)

(58) Field of Classification Search
None
See application file for complete search history.

(56) References Cited

U.S. PATENT DOCUMENTS

| | | | |
|---|---|---|---|
| 2017/0262790 A1* | 9/2017 | Khasis | .................. G08G 1/012 |
| 2018/0157262 A1 | 6/2018 | Ao et al. | |
| 2018/0267382 A1* | 9/2018 | Kwon | .................. H04N 5/332 |
| 2019/0193722 A1 | 6/2019 | Yamamuro et al. | |
| 2019/0235824 A1 | 8/2019 | Ikeda et al. | |
| 2019/0250635 A1 | 8/2019 | Ikeda et al. | |

(Continued)

FOREIGN PATENT DOCUMENTS

| | | |
|---|---|---|
| CN | 108153299 A | 6/2018 |
| CN | 110097692 A | 8/2019 |
| CN | 110155078 A | 8/2019 |

(Continued)

*Primary Examiner* — Alan D Hutchinson
*Assistant Examiner* — Andy Schneider
(74) *Attorney, Agent, or Firm* — Oliff PLC

(57) ABSTRACT

A server is communicably connected to a plurality of vehicles that includes vehicles usable as guest rooms, and includes a server controller. The server controller is configured to control a formation of the plurality of vehicles depending on a positional relationship between windows or doors provided in the plurality of vehicles, or depending on scenery from the windows provided in the plurality of vehicles.

18 Claims, 7 Drawing Sheets

(56) References Cited

U.S. PATENT DOCUMENTS

2019/0377365 A1* 12/2019 Terahata ................ G06Q 20/14

FOREIGN PATENT DOCUMENTS

| JP | S62-258888 A | 11/1987 |
| --- | --- | --- |
| JP | 2631366 B2 | 7/1997 |
| JP | 2018091711 A | 6/2018 |
| JP | 2019077326 A | 5/2019 |
| JP | 2019-116239 A | 7/2019 |

* cited by examiner

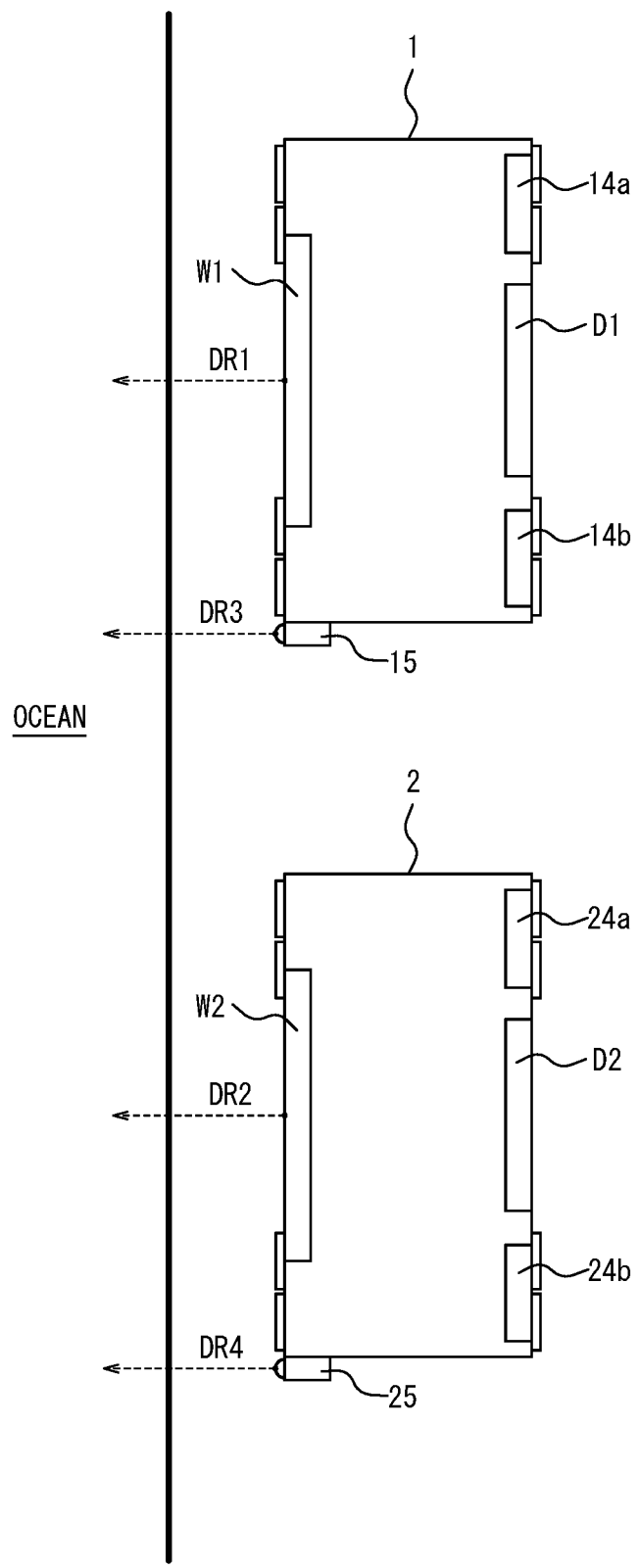

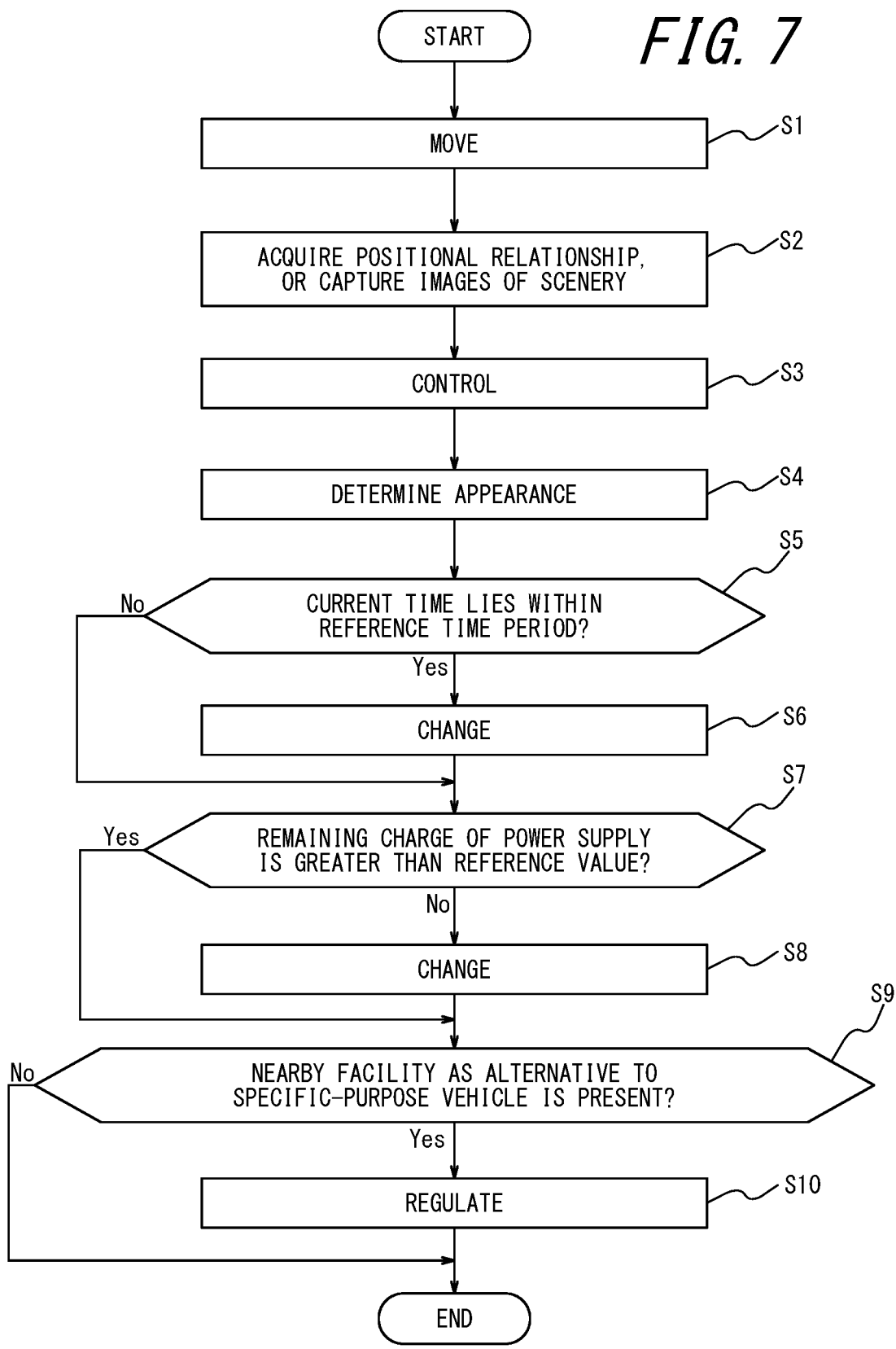

SERVER, INFORMATION PROCESSING SYSTEM, NON-TRANSITORY COMPUTER-READABLE MEDIUM, AND CONTROL METHOD

CROSS-REFERENCE TO RELATED APPLICATION

This application claims priority to Japanese Patent Application No. 2019-229665 (filed on Dec. 19, 2019), the entire contents of which are incorporated herein by reference.

TECHNICAL FIELD

The present disclosure relates to a server, an information processing system, a program, and a control method.

BACKGROUND

Known methods have been developed to divide buildings for resort hotels into a plurality of units, and transport and relocate the units using a plurality of vehicles (for example, Patent Literature [PTL] 1).

CITATION LIST

Patent Literature

PTL 1: JP S62-258888 A

SUMMARY

When the plurality of units is arranged, the privacy of users of guest rooms in each unit, or the scenery from the guest rooms, is not considered in the above PTL 1.

It would be helpful to provide a server, an information processing system, a program, and a control method that are capable of arranging the plurality of vehicles while considering the privacy or the scenery.

A server according to an embodiment of the present disclosure is communicably connected to a plurality of vehicles that includes vehicles usable as guest rooms. The server includes a server controller configured to control a formation of the plurality of vehicles depending on a positional relationship between windows or doors provided in the plurality of vehicles, or depending on scenery from the windows provided in the plurality of vehicles.

A program according to an embodiment of the present disclosure is configured to cause a computer, as a server communicably connected to a plurality of vehicles that includes vehicles usable as guest rooms, to execute operations, the operations including controlling a formation of the plurality of vehicles depending on a positional relationship between windows or doors provided in the plurality of vehicles, or depending on scenery from the windows provided in the plurality of vehicles.

A control method according to an embodiment of the present disclosure is performed by a server communicably connected to a plurality of vehicles that includes vehicles usable as guest rooms. The control method includes controlling a formation of the plurality of vehicles depending on a positional relationship between windows or doors provided in the plurality of vehicles, or depending on scenery from the windows provided in the plurality of vehicles.

A server, an information processing system, a program, and a control method according to an embodiment of the present disclosure may arrange the plurality of vehicles, while considering privacy or the scenery.

BRIEF DESCRIPTION OF THE DRAWINGS

In the accompanying drawings:

FIG. 6 illustrates another example of the formation;
and
FIG. 7 is a flowchart illustrating operations of the server.

DETAILED DESCRIPTION

Figure 1:
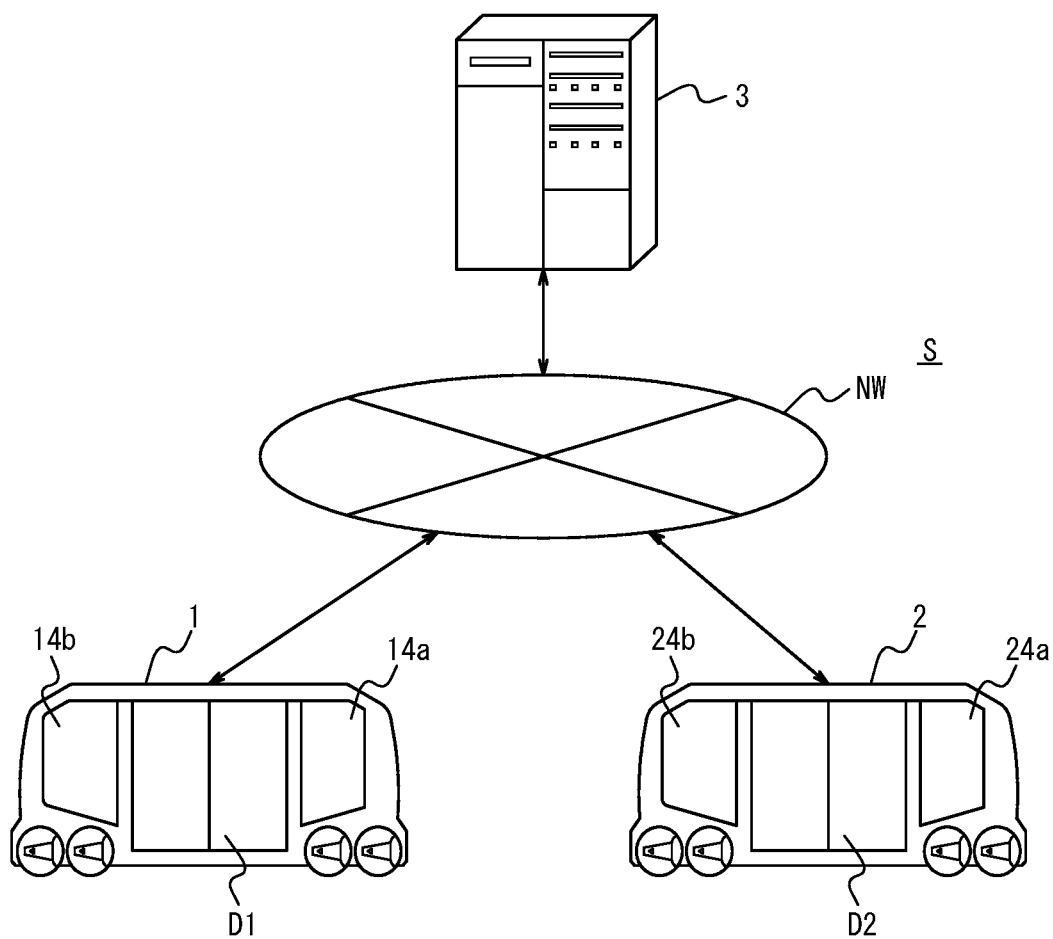
FIG. 1 is a schematic diagram of an information processing system.

FIG. 1 is a schematic diagram of an information processing system S according to an embodiment. The information processing system S includes a first vehicle 1, a second vehicle 2, and a server 3, which are communicably connected to each other. In FIG. 1, a single first vehicle 1, a single second vehicle 2, and a single server 3 are illustrated for convenience of explanation. However, each the first vehicle 1, the second vehicle 2, and the server 3 is not limited to one in number. The first vehicle 1, the second vehicle 2, and the server 3 are connected, for example, via a network NW which includes a mobile communication network, the Internet, or the like.

The first vehicle 1 and the second vehicle 2 are, for example, any type of automobiles, such as gasoline-powered vehicles, diesel-powered vehicles, HVs, PHVs, EVs, or FCVs. "HV" is an abbreviation of Hybrid Vehicle. "PHV" is an abbreviation of Plug-in Hybrid Vehicle. "EV" is an abbreviation of Electric Vehicle. "FCV" is an abbreviation of Fuel Cell Vehicle. Although the driving of the first vehicle 1 and the second vehicle 2 may be automated at any level in the present embodiment, the first vehicle 1 and the second vehicle 2 may be driven by a driver in another embodiment. The automation level is, for example, one of Level 1 to Level 5 according to the classification of the Society of Automotive Engineers (SAE). "SAE" is an abbreviation of Society of Automotive Engineers. The first vehicle 1 and the second vehicle 2 may be MaaS-dedicated vehicles. "MaaS" is an abbreviation of Mobility as a Service.

The first vehicle 1 and the second vehicle 2 may be usable as guest rooms. The guest rooms may include tables, sofas, beds, kitchens, and refrigerators, in a manner similar to, for example, camping cars. The first vehicle 1 and the second vehicle 2 respectively include a door D1 and a door D2, which allow passengers to get in and out. The first vehicle 1 and the second vehicle 2 further include a display 14a and a display 14b, and a display 24a and a display 24b, respectively, and are capable of displaying predetermined images as will be described later.

The server 3 is located in a facility, such as a data center. The server 3 is, for example, a server that belongs to a crowd computing system or another computing system.

An outline of processing that is executed by the server 3 according to the present embodiment is now described. A server controller 31 of the server 3 is configured to control a formation of the plurality of vehicles depending on a positional relationship between windows or the doors provided in the plurality of vehicles. The control of the formation may include displacement of the vehicles, or rotation of the vehicles in a horizontal direction. The above configuration enables the server controller 31 to consider the privacy of the passengers by, for example, controlling whether the windows or the doors provided in the plurality of vehicles are to face each other. The server controller 31 is also configured to control the formation of the plurality of vehicles depending on scenery from the windows provided in the plurality of vehicles. The above configuration allows the server controller 31 to arrange the vehicles to be adjacent to a spot with pleasant scenery, thereby improving user satisfaction.

Figure 2:
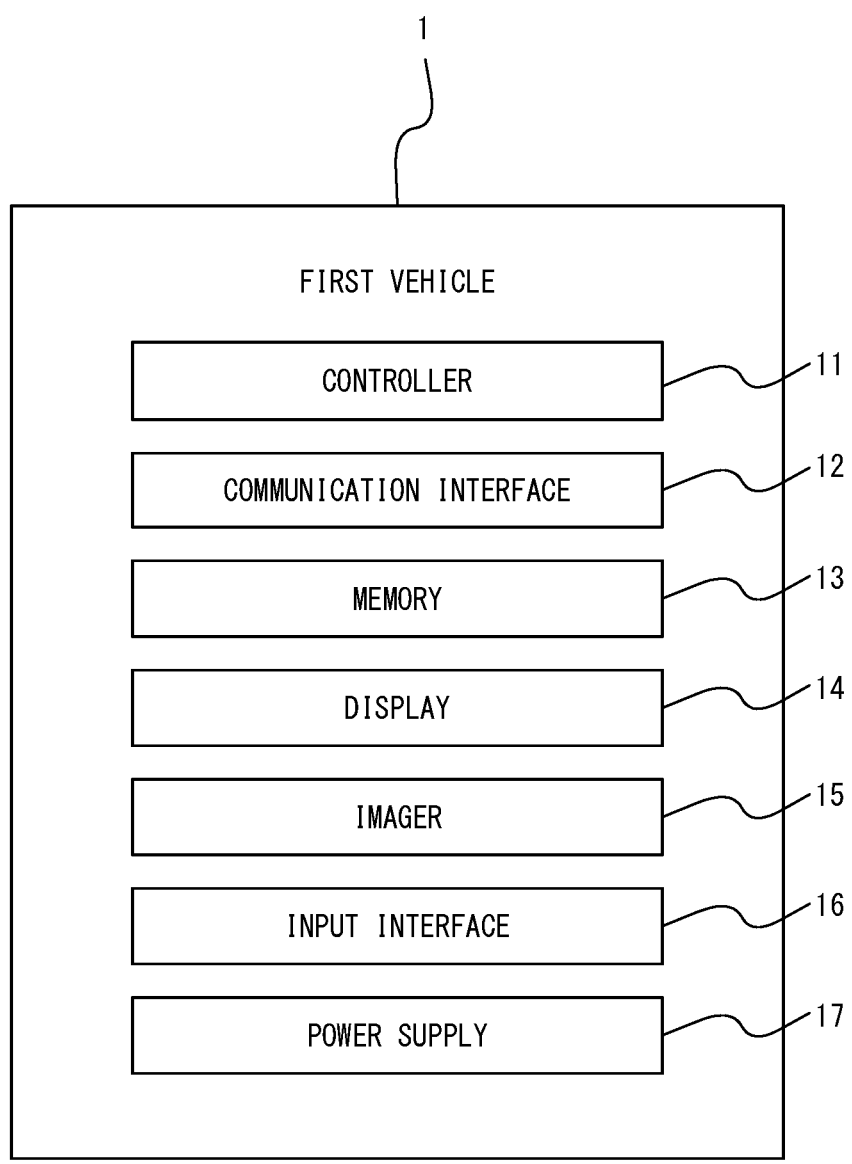
FIG. 2 is a functional block diagram of a first vehicle.

With reference to FIG. 2, an internal configuration of the first vehicle 1 is described in detail.

The first vehicle 1 includes a controller 11, a communication interface 12, a memory 13, a display 14, an imager 15, an input interface 16, and a power supply 17. These functional parts are communicably connected to each other, for example, via a dedicated line.

The controller 11 includes, for example, one or more general-purpose processors, such as a Central Processing Unit (CPU) or a Micro Processing Unit (MPU). Alternatively, the controller 11 includes one or more dedicated processors that are dedicated to specific processing. The controller 11 is not limited to processors and may include one or more dedicated circuits. Examples of dedicated circuits may include a Field-Programmable Gate Array (FPGA) and an Application Specific Integrated Circuit (ASIC).

The communication interface 12 includes one or more communication modules for connection to the network NW that conform to wired or wireless Local Area Network (LAN) standards. Alternatively, the communication interface 12 may include a module conforming to one or more mobile communication standards, such as the 4th Generation (4G) or the 5th Generation (5G) standards. The communication interface 12 may include a communication module conforming to near field communications, such as Bluetooth® (Bluetooth is a registered trademark in Japan, other countries, or both), AirDrop® (AirDrop is a registered trademark in Japan, other countries, or both), IrDA, ZigBee® (ZigBee is a registered trademark in Japan, other countries, or both), Felica® (Felica is a registered trademark in Japan, other countries, or both), or RFID. The communication interface 12 is configured to transmit and receive any information via the network NW. This information includes, for example, position information obtained using Global Positioning System (GPS).

The memory 13 may be, but is not limited to, a semiconductor memory, a magnetic memory, or an optical memory. The memory 13 may function as, for example, a main memory, an auxiliary memory, or a cache memory. The memory 13 may store information resulting from analysis or processing performed by the controller 11. The memory 13 may also store various types of information, etc., regarding operations and control of the first vehicle 1. The memory 13 may store a system program, an application program, embedded software, etc.

The display 14 is a display interface and includes, for example, a panel display. As illustrated in FIG. 1, the display 14 includes a display 14a and a display 14b. The display 14 is configured to display information read out of the memory 13, an image captured by the imager 15, or information generated by the controller 11.

The imager 15 includes a camera and is configured to capture an image of surrounding scenery. The imager 15 may store the captured image in the memory 13 or transmit the captured image to the controller 11 for the purpose of analysis.

The input interface 16 includes one or more input interfaces that detect a user input and send input information to the controller 11. Examples of input interfaces may include, but are not limited to, a physical key, a capacitive key, a touch screen integrally provided in the panel display, a microphone configured to receive audio input, and an IC card reader.

The power supply 17 is configured to supply power to the functional parts of the first vehicle 1. The power supply 17 may include a rechargeable secondary battery. Examples of secondary batteries may include a lithium-ion battery, a nickel-cadmium battery, a lead-acid battery, and a nickel-metal hydride battery. The power supply 17 is not limited to a second battery and may include a non-rechargeable primary battery. Examples of primary batteries may include an alkaline battery and a manganese battery.

Figure 3:
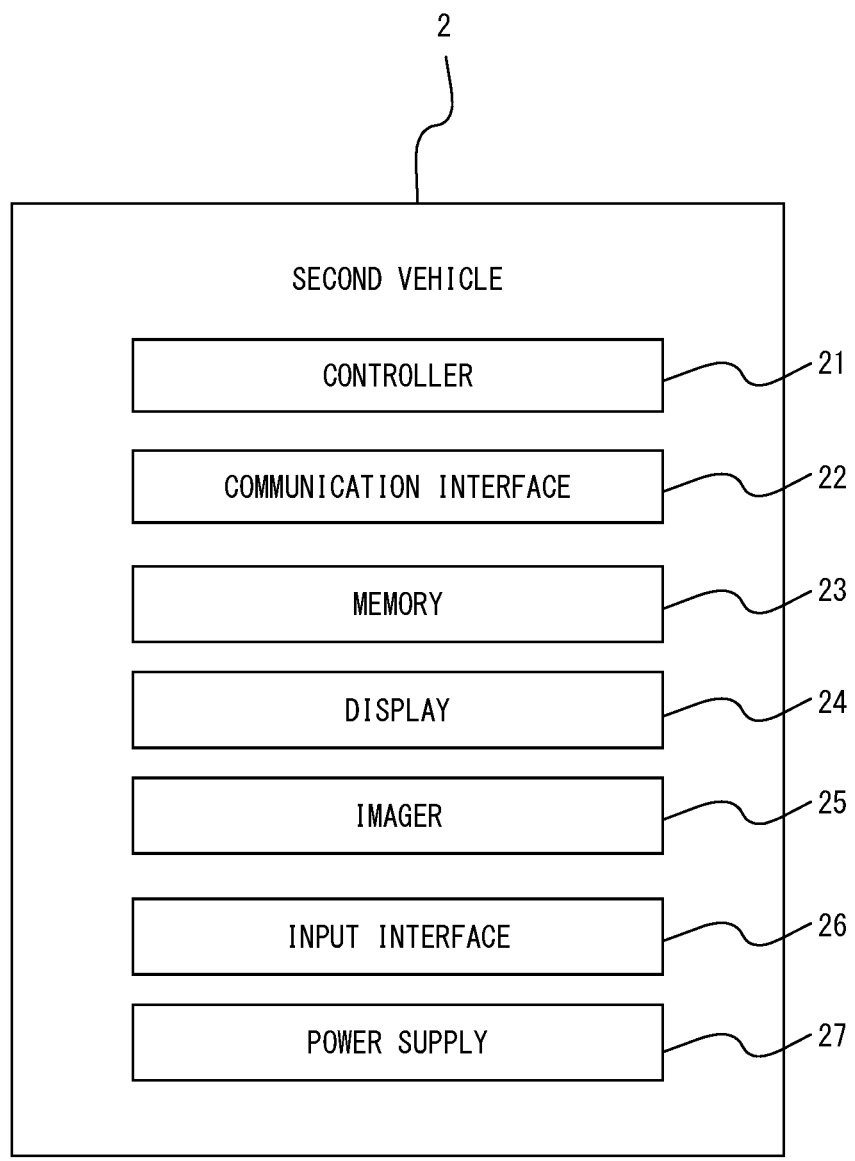
FIG. 3 is a functional block diagram of a second vehicle.

With reference to FIG. 3, an internal configuration of the second vehicle 2 is described in detail.

The second vehicle 2 includes a controller 21, a communication interface 22, a memory 23, a display 24, an imager 25, an input interface 26, and a power supply 27. These functional parts are communicably connected to each other, for example, via a dedicated line. In the present embodiment, hardware configurations of the controller 21, the communication interface 22, the memory 23, the display 24, the imager 25, the input interface 26, and the power supply 27 are identical to those of the controller 11, the communication interface 12, the memory 13, the display 14, the imager 15, the input interface 16, and the power supply 17. A description thereof is therefore omitted here.

Figure 4:
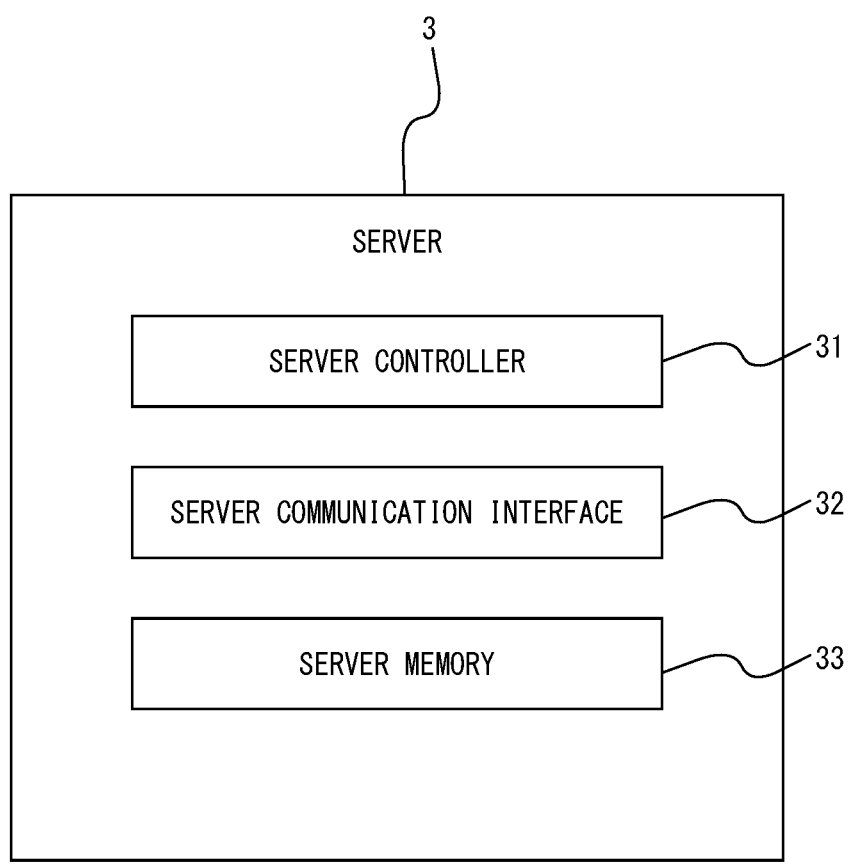
FIG. 4 is a functional block diagram of a server.

With reference to FIG. 4, an internal configuration of the server 3 is described in detail.

The server 3 includes a server controller 31, a server communication interface 32, and a server memory 33. These functional parts are communicably connected to each other.

The server controller 31 includes, for example, one or more general-purpose processors, such as a CPU or an MPU, or one or more dedicated processors that are dedicated to specific processing. The server controller 31 is not limited to processors and may include one or more dedicated circuits. Examples of dedicated circuits may include an FPGA and an ASIC.

The server communication interface 32 includes one or more communication modules for connection to the network NW that conform to wired or wireless LAN standards, or a module conforming to mobile communication standards, such as 4G or 5G. The server communication interface 32 may include a communication module conforming to near field communications, such as Bluetooth®, AirDrop®, IrDA, ZigBee®, Felica®, or RFID. In the present embodiment, the server 3 is connected to the network NW via the server communication interface 32. The server communication interface 32 is configured to transmit and receive any information via the network NW.

The server memory 33 may be, but is not limited to, a semiconductor memory, a magnetic memory, or an optical memory. The server memory 33 may function as, for example, a main memory, an auxiliary memory, or a cache memory. The server memory 33 may store information resulting from analysis or processing performed by the server controller 31. The server memory 33 may also store various types of information regarding operations and control of the server 3. The server memory 33 may store a system program, an application program, embedded software, etc.

Processing executed in the information processing system S according to the present embodiment is now described in detail. The example herein supposes a father and a child for whom consideration of privacy is of relatively low importance. The father is assumed to board the first vehicle 1, and the child is assumed to board the second vehicle 2.

Upon receiving, from at least one of the father and the child, an instruction to move to a destination, the first vehicle 1 and the second vehicle 2 start to move. As a method of conducting a process from the receipt of the instruction to the completion of the movement, any existing known method may be employed.

The server controller 31 determines a purpose of use that has been set for the first vehicle 1 and the second vehicle 2 by at least one of the father and the child. The server controller 31 reads the server memory 33 to acquire formation information stored in correspondence with the purpose of use. When the first vehicle 1 and the second vehicle 2 arrive at the destination, the server controller 31 controls the formation by adjusting the positional relationship between a window or a door provided in the first vehicle 1 and a window or a door provided in the second vehicle 2, in accordance with the formation information corresponding to the purpose of use. Positions in which windows or doors are provided and the number of windows or doors may be freely selected.

Figure 5:
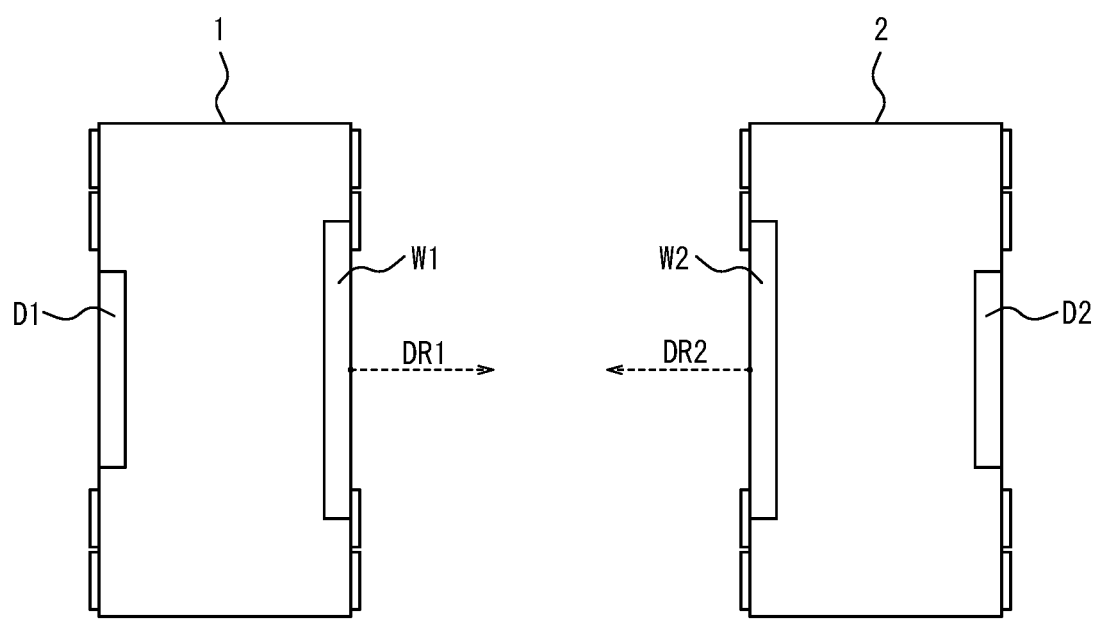
FIG. 5 illustrates an example of a formation.

As illustrated in FIG. 5, for example, a direction extending perpendicular to a window W1 from a reference point on the window W1 is defined as a direction DR1. A direction extending perpendicular to a window W2 from a reference point on the window W2 is defined as a direction DR2. The reference points on the windows may be the centers of the windows. These directions may be determined by using a GPS sensor, an accelerometer, a gyro-sensor, and/or an electronic compass provided in each of the first vehicle 1 and the second vehicle 2.

As illustrated in FIG. 5, when determining that the set purpose of use is a family trip, the server controller 31 controls the formation of the first vehicle 1 and the second vehicle 2 so that the direction DR1 and the direction DR2 face each other. The above configuration makes the state inside the guest room of the child visible from the guest room of the father, through the window W1 and the window W2.

As an alternative example, a case in which the set purpose of use is a trip with friends will be described. In this case, consideration of privacy is of relatively high importance compared with the case of the trip by the father and the child. When determining that the set purpose of use is the trip with friends, the server controller 31 may control the formation of the first vehicle 1 and the second vehicle 2 so that the direction DR1 and the direction DR2 are in substantially opposite directions to each other. The above configuration prevents the window W1 and the window W2 from facing each other, and therefore, the state inside the guest room of the other person is not visible through the window W1 or the window W2. Accordingly, privacy between the friends is respected. As an alternative example of the case in which the set purpose of use is the trip with friends, the server controller 31 may control the formation of the first vehicle 1 and the second vehicle 2 so that the door D1 and the door D2 are prevented from facing each other. The above configuration prevents a situation in which the two friends happen to open the doors from inside the guest rooms and bump into each other. Accordingly, privacy between the friends is respected.

Additionally, the server controller 31 may control the formation of the first vehicle 1 and the second vehicle 2 depending on scenery from the windows. As illustrated in FIG. 6, a direction DR3, in which the imager 15 of the first vehicle 1 captures an image, is substantially parallel to the direction DR1. The first vehicle 1 is therefore capable of capturing an image of the scenery from the window W1. A direction DR4, in which the imager 25 of the second vehicle 2 captures an image, is substantially parallel to the direction DR2. The second vehicle 2 is therefore capable of capturing an image of the scenery from the window W2. The server controller 31 acquires the images captured by the imager 15 and the imager 25 and analyzes the captured images to score pleasantness of the scenery. The scoring may be conducted by analyzing color distributions in the captured images. Any appropriate image analysis technique, such as machine learning, may be adopted for the scoring. The server controller 31 controls the formation of the first vehicle 1 and the second vehicle 2 so that the scores are greater than or equal to a predetermined value. In the example of FIG. 6, the server controller 31 controls the first vehicle 1 and the second vehicle 2 so that the direction DR3 and the direction DR4 are turned toward the ocean that offers pleasant scenery.

The server controller 31 may determine an appearance of at least one of the first vehicle 1 and the second vehicle 2 depending on the scenery. Specifically, as illustrated in FIG. 6, the display 14*a* and the display 14*b*, which are included in the first vehicle 1, and the display 24*a* and the display 24*b*, which are included in the second vehicle 2, are respectively provided on an outer surface of the first vehicle 1 and an outer surface of the second vehicle 2. The server controller 31 analyzes the images captured by the imager 15 and the imager 25 to determine a color in the scenery. In the example of FIG. 6, since the first vehicle 1 and the second vehicle 2 are parked along the ocean, the server controller 31 determines the color in the scenery as blue. The server controller 31 sets blue as a color for images to be displayed by the display 14*a*, the display 14*b*, the display 24*a*, and the display 24*b*, in harmony with the color in the scenery. In this case, when the scenery includes a different color than blue, the server controller 31 may additionally set the color for the display 14*a*, the display 14*b*, the display 24*a*, and the display 24*b*.

The server controller 31 may change the formation depending on time of day. Specifically, the server controller 31 determines the current time and determines whether the current time lies within a reference time period. The reference time period is stored in the server memory 33 in correspondence with the formation information. When determining that the current time lies within the reference time period, the server controller 31 controls the formation of the first vehicle 1 and the second vehicle 2 in accordance with the corresponding formation information. For example, when determining that the current time lies within a sunset time period from 16:00 to 16:30, the server controller 31 changes the formation of the first vehicle 1 and the second vehicle 2 so that the direction DR1 and the direction DR2 are turned toward the west. This enables the users in the vehicles to watch the sunset through the window W1 and the window W2.

The server controller 31 may control the formation of the first vehicle 1 and the second vehicle 2 depending on remaining charges in the power supply 17 of the first vehicle 1 and the power supply 27 of the second vehicle 2. Specifically, the server controller 31 determines the remaining charges in the power supply 17 and the power supply 27. When determining that the remaining charge in at least one of the power supply 17 and the power supply 27 is not greater than a reference value, the server controller 31 controls the vehicle whose remaining charge is not greater than the reference value to park closer to a road. This facilitates the vehicle with a low remaining charge to drive onto the road, thereby allowing the vehicle to promptly depart for a neighboring charging station at any time before the remaining charge is almost depleted.

At least one of the first vehicle 1 and the second vehicle 2 may request the server controller 31 to dispatch one or more specific-purpose vehicles, as needed. For example, the first vehicle 1 and the second vehicle 2 may each request dispatch of a bath vehicle with a bathroom, such that a total of two are to be dispatched. Upon receiving the requests, the server controller 31 regulates the number of vehicles to be dispatched, depending on a nearby facility that is an alternative to the specific-purpose vehicles. For example, the server controller 31 searches for, as the alternative nearby facility, a public bath located within a predetermined distance from the first vehicle 1 and the second vehicle 2. Upon detecting one public bath, the server controller 31 determines that either the father or the child is to use the nearby public bath and dispatches only a single bath vehicle. The server controller 31 controls the bath vehicle that is dispatched to join the formation of the first vehicle 1 and the second vehicle 2. The server controller 31 notifies the first vehicle 1 and the second vehicle 2 that only the single bath vehicle has been dispatched and that either the father or the child is to use the nearby public bath. As an alternative example, the server controller 31 may notify the first vehicle 1 and the second vehicle 2 that both the father and the child are to use the nearby public bath, without dispatching any bath vehicles.

With reference to FIG. 7, a control method performed by the server 3 will be described.

In Step S1, upon receiving an instruction from the user(s), the server controller 31 controls the first vehicle 1 and the second vehicle 2 to move to the designated destination.

In Step S2, the server controller 31 acquires the positional relationship between the window or the door provided in the first vehicle 1 and the window or the door provided in the second vehicle 2, or acquires the images of the scenery from the windows provided in the first vehicle 1 and the second vehicle 2.

In Step S3, the server controller 31 controls the formation of the first vehicle 1 and the second vehicle 2 depending on the positional relationship between the windows or the doors, or depending on the scenery from the windows.

In Step S4, the server controller 31 determines the appearances of the first vehicle 1 and the second vehicle 2 depending on the scenery.

In Step S5, the server controller 31 determines whether the current time lies within the reference time period.

If a result of the determination is "yes" in Step S5, the process moves to Step S6, in which the server controller 31 changes the formation in accordance with the formation information. If the result of the determination is "no" in Step S5, the server controller 31 performs Step S7 without performing Step S6.

In Step S7, the server controller 31 determines whether the remaining charge in at least one of the power supply 17 and the power supply 27 is greater than the reference value.

If a result of the determination is "no" in Step S7, the process moves to Step S8, in which the server controller 31 changes the formation by controlling the vehicle including the power supply whose remaining charge is not greater than the reference value to park closer to the road. If the result of the determination is "yes" in Step S7, the server controller 31 performs Step S9 without performing Step S8.

In Step S9, upon receiving, from at least one of the first vehicle 1 and the second vehicle 2, the request for the dispatch of the specific-purpose vehicles, the server controller 31 determines whether there is a nearby facility that is an alternative to the vehicle(s).

If a result of the determination is "yes" in Step S9, the process moves to Step S10, in which the server controller 31 regulates the number of vehicles to be dispatched. If the result of the determination is "no" in Step S9, the server controller 31 does not perform Step S10 and ends the processing flow.

As has been described, according to the present embodiment, the server 3 is communicably connected to the plurality of vehicles, which includes those usable as guest rooms, and includes the server controller 31. The plurality of vehicles in the present embodiment refers to the first vehicle 1 and the second vehicle 2. The server controller 31 is configured to control the formation of the plurality of vehicles depending on the positional relationship between the windows or the doors provided in the plurality of vehicles. The above configuration allows the server controller 31, for example, to control the formation so that the windows or the doors are prevented from facing each other, thereby arranging the vehicles while considering the privacy of the passengers. The server controller 31 is also configured to control the formation depending on the scenery from the windows, thereby arranging the vehicles while considering, for example, the pleasantness of the scenery.

Furthermore, according to the present embodiment, the server controller 31 is configured to determine the appearances of the plurality of vehicles depending on the scenery. The above configuration allows the server controller 31 to harmonize the vehicles with the scenery to some extent, thereby preventing the presence of the vehicles from spoiling the scenery.

Moreover, according to the present embodiment, the server controller 31 is configured to change the formation depending on time of day. The above configuration allows the server controller 31, for example, to turn the vehicles to a specific direction that will offer pleasant scenery during a certain time period, thereby improving the satisfaction of the passengers.

Moreover, according to the present embodiment, at least one vehicle in the plurality of vehicles includes a power supply. The server controller 31 is configured to change the formation depending the remaining charge in the power supply. The above configuration allows the server controller 31, for example, to control the vehicle whose remaining charge is not greater than the reference value to park in the vicinity of the road, thereby permitting the vehicle to depart for the charging station at any time without difficulty.

Moreover, according to the present embodiment, upon receiving requests for dispatch of a specific-purpose vehicle, the server controller 31 is configured to regulate the number of vehicles to be dispatched depending on an alternative nearby facility. The above configuration allows the server controller 31 to take advantage of the nearby facility and reduce the number of specific-purpose vehicles to be dispatched.

Moreover, according to the present embodiment, the server controller 31 is configured to control the formation further depending on the purpose of use that has been set for each vehicle in the plurality of vehicles. The above configuration allows the server controller 31 to arrange the vehicles in accordance with the purposes of use, thereby improving satisfaction with the use.

While the present disclosure has been described with reference to the drawings and examples, it is to be noted that various modifications and revisions may be implemented by those skilled in the art based on the present disclosure. Accordingly, such modifications and revisions are included within the scope of the present disclosure. For example, functions or the like included in each means, each step, or the like can be rearranged without logical inconsistency, and a plurality of means, steps, or the like can be combined together or divided.

For example, in the above embodiment, a program that executes all or some of the functions or processing of the first vehicle 1, the second vehicle 2, or the server 3 may be recorded on a computer-readable recording medium. The computer-readable recording medium includes a non-transitory computer-readable medium and may be, for example, a magnetic recording apparatus, an optical disc, a magneto-optical recording medium, or a semiconductor memory. The program may be distributed, for example, by selling, transferring, or renting a portable recording medium, such as a Digital Versatile Disc (DVD) or a Compact Disc Read Only Memory (CD-ROM), on which the program is recorded. The program may also be distributed by storing the program in a storage of the server and transmitting the program from the server to another computer. The program may be provided as a program product. The present disclosure may be implemented as a program that can be executed by a processor.

In the above embodiment, the server 3 is provided outside the first vehicle 1 and the second vehicle 2. In another embodiment, however, the server 3 may be installed inside the first vehicle 1 or the second vehicle 2.

The invention claimed is:

1. A server communicably connected to a plurality of vehicles that includes vehicles usable as guest rooms, the server comprising a server controller configured to
    control a formation of the plurality of vehicles depending on a positional relationship between windows or doors provided in the plurality of vehicles, or depending on scenery from the windows provided in the plurality of vehicles,
    wherein the server controller is further configured to change the formation depending on time of day,
    wherein the server controller is further configured to control the formation further depending on a purpose of use that has been set for each vehicle in the plurality of vehicles, and
    wherein control of the formation comprises rotation of the plurality of vehicles in a horizontal direction.

2. The server according to claim 1, wherein
    the server controller is configured to determine appearances of the plurality of vehicles depending on the scenery.

3. The server according to claim 2, wherein
    each vehicle in the plurality of vehicles has an outer surface including a display, and
    the server controller is configured to determine the appearances of the plurality of vehicles by determining a color for an image to be displayed by the display.

4. The server according to claim 1, wherein
    at least one vehicle in the plurality of vehicles includes a power supply, and the server controller is further configured to change the formation depending on a remaining charge of the power supply.

5. The server according to claim 1, wherein
    the server controller is further configured, upon receiving from at least one vehicle in the plurality of vehicles a request for dispatch of one or more specific-purpose vehicles, to regulate the number of vehicles to be dispatched depending on a nearby facility that is an alternative to the one or more specific-purpose vehicles.

6. The server according to claim 1, wherein the server is further configured to assign a pleasantness score of scenery in a vicinity of the vehicle, and control the plurality of vehicles so that the windows are turned towards scenery that exceeds a minimum pleasantness score.

7. The server according to claim 1, wherein the control of formation of the plurality of vehicles comprises the positional relationship between windows or doors provided in one of the plurality of vehicles with respect to windows or doors provided in an other of the plurality of vehicles.

8. An information processing system comprising:
    the server according to claim 1; and
    the plurality of vehicles according to claim 1, including the vehicles configured to be usable as guest rooms.

9. A non-transitory computer-readable medium storing a program configured to cause a computer, as a server communicably connected to a plurality of vehicles that includes vehicles usable as guest rooms, to execute operations, the operations comprising
    controlling a formation of the plurality of vehicles depending on a positional relationship between windows or doors provided in the plurality of vehicles, or depending on scenery from the windows provided in the plurality of vehicles,
    change the formation depending on time of day,
    controlling the formation further depending on a purpose of use that has been set for each vehicle in the plurality of vehicles, and
    controlling of the formation comprises rotation of the plurality of vehicles in a horizontal direction.

10. The non-transitory computer-readable medium according to claim 9, the operations further comprising
    determining appearances of the plurality of vehicles depending on the scenery.

11. The non-transitory computer-readable medium according to claim 10, wherein
    each vehicle in the plurality of vehicles has an outer surface including a display, and
    the operations further comprise determining the appearances of the plurality of vehicles by determining a color for an image to be displayed by the display.

12. The non-transitory computer-readable medium according to claim 9, wherein
    at least one vehicle in the plurality of vehicles includes a power supply, and
    the operations further comprise changing the formation depending on a remaining charge of the power supply.

13. The non-transitory computer-readable medium according to claim 9, the operations further comprising,
    upon receiving from at least one vehicle in the plurality of vehicles a request for dispatch of one or more specific-purpose vehicles, regulating the number of vehicles to be dispatched depending on a nearby facility that is an alternative to the one or more specific-purpose vehicles.

14. A control method performed by a server communicably connected to a plurality of vehicles that includes vehicles usable as guest rooms, the control method comprising controlling a formation of the plurality of vehicles depending on a positional relationship between windows or doors provided in the plurality of vehicles, or depending on scenery from the windows provided in the plurality of vehicles, changing the formation depending on time of day, controlling the formation further depending on a purpose of use that has been set for each vehicle in the plurality of vehicles, and controlling of the formation comprises rotation of the plurality of vehicles in a horizontal direction.

15. The control method according to claim 14, further comprising determining appearances of the plurality of vehicles depending on the scenery.

16. The control method according to claim 15, wherein each vehicle in the plurality of vehicles has an outer surface including a display, and the control method further comprises determining the appearances of the plurality of vehicles by determining a color for an image to be displayed by the display.

17. The control method according to claim 14, wherein at least one vehicle in the plurality of vehicles includes a power supply, and the control method further comprises changing the formation depending on a remaining charge of the power supply.

18. The control method according to claim 14, further comprising, upon receiving from at least one vehicle in the plurality of vehicles a request for dispatch of one or more specific-purpose vehicles, regulating the number of vehicles to be dispatched depending on a nearby facility that is an alternative to the one or more specific-purpose vehicles.

* * * * *